United States Patent
Zhang

(10) Patent No.: US 9,350,652 B2
(45) Date of Patent: May 24, 2016

(54) METHOD, SYSTEM AND ROUTER FOR CHANGING APPLICATION IN BGP SESSION

(75) Inventor: Haifeng Zhang, Beijing (CN)

(73) Assignee: HANGZHOU H3C TECHNOLOGIES CO., LTD., Zhejiang (CN)

( * ) Notice: Subject to any disclaimer, the term of this patent is extended or adjusted under 35 U.S.C. 154(b) by 397 days.

(21) Appl. No.: 13/701,781

(22) PCT Filed: Jun. 2, 2011

(86) PCT No.: PCT/CN2011/075211
§ 371 (c)(1),
(2), (4) Date: Dec. 27, 2012

(87) PCT Pub. No.: WO2011/150862
PCT Pub. Date: Dec. 8, 2011

(65) Prior Publication Data
US 2013/0128888 A1    May 23, 2013

(30) Foreign Application Priority Data
Jun. 3, 2010   (CN) .......................... 2010 1 0197069

(51) Int. Cl.
*H04L 12/28*     (2006.01)
*H04L 12/721*    (2013.01)
*H04L 12/715*    (2013.01)
*H04L 12/745*    (2013.01)
(52) U.S. Cl.
CPC ................ *H04L 45/44* (2013.01); *H04L 45/04* (2013.01); *H04L 45/748* (2013.01)
(58) Field of Classification Search
CPC ....................................................... H04L 45/44
USPC .......................................................... 370/390
See application file for complete search history.

(56) References Cited

U.S. PATENT DOCUMENTS

| | | | |
|---|---|---|---|
| 6,553,423 B1 * | 4/2003 | Chen ............................. | 709/230 |
| 2002/0116501 A1 * | 8/2002 | Ho et al. ....................... | 709/227 |
| 2006/0140136 A1 * | 6/2006 | Filsfils et al. ................. | 370/255 |
| 2006/0164995 A1 * | 7/2006 | Djernaes et al. .............. | 370/238 |
| 2006/0198322 A1 | 9/2006 | Hares | |
| 2008/0062891 A1 * | 3/2008 | Van der Merwe ...... | H04L 45/04 370/254 |
| 2008/0228940 A1 * | 9/2008 | Thubert ............ | H04L 29/12207 709/238 |
| 2009/0097406 A1 * | 4/2009 | Nilakantan et al. ........... | 370/235 |
| 2009/0122724 A1 * | 5/2009 | Rosenberg .............. | H04L 45/02 370/255 |
| 2010/0008363 A1 * | 1/2010 | Ee et al. ........................ | 370/392 |

FOREIGN PATENT DOCUMENTS

| | | |
|---|---|---|
| CN | 101099342 | 1/2008 |
| CN | 101631130 | 1/2010 |
| WO | WO2008/031334 | 3/2008 |

OTHER PUBLICATIONS

Chen, E., "Route Refresh Capability for BGP-4", RFC 2918, Sep. 30, 2000, http://tools.ietf.org/pdf/rfc2918.pdf.

(Continued)

*Primary Examiner* — Gerald Smarth
(74) *Attorney, Agent, or Firm* — Mannava & Kang, P.C.

(57) ABSTRACT

A method and system for changing an application in a BGP session are provided. The method may be applied by a first router, in a session established between the first router and a second router, and in which an application is enabled. The method comprises the first router changing a local capability value to support a changed application and changing an address family according to the changed application.

17 Claims, 6 Drawing Sheets

(56) References Cited

OTHER PUBLICATIONS

CN First Office Action dated Jun. 21, 2013 issued on CN Patent Application No. 201010197069.X dated Jun. 3, 2010, The State Intellectual Property Office, P.R. China.

Chen, E., "Route Refresh Capability for BGP-4", IETF, Sep. 2000, pp. 1-4, RFC2918.

International Search Report and Written Opinion dated Sep. 8, 2011 issued on PCT Patent Application No. PCT/CN2011/075211 filed Jun. 2, 2011, The State Intellectual Property Office, the P.R. China.

* cited by examiner

METHOD, SYSTEM AND ROUTER FOR CHANGING APPLICATION IN BGP SESSION

CLAIM FOR PRIORITY

The present application is a national stage filing under 35 U.S.C 371 of PCT application number PCT/CN2011/075211, having an international filing date of Jun. 2, 2011, which claims priority to Chinese Patent Application No. 201010197069.x, filed on Jun. 3, 2010, the disclosures of which are hereby incorporated by reference in their entireties.

BACKGROUND OF THE INVENTION

Border Gateway Protocol (BGP) is a protocol for dynamically discovering routing between autonomous systems. BGP enables strategies configured by users to be implemented. BGP is an external routing protocol Internet standard and is widely applied by Internet Service Provider (ISP).

Routers sending BGP messages are called BGP speakers. The BGP speaker continuously receives and generates new route information, and advertises the new route information to other BGP speakers. When a BGP speaker in an autonomous system receives a new route from another autonomous system, if this new route is better than current known route or if no route is received currently, the BGP speaker advertises the received route to all other BGP speakers in the autonomous system. Another BGP speaker exchanging the route information with the BGP speaker is called a BGP peer. Multiple related BGP peers form a BGP peer group.

DETAILED DESCRIPTION

In one example, the process of establishing a BGP session between BGP peers goes through the following states: 1. Idle; 2. Connect; 3. Active; 4. OpenSend; 5. OpenConfirm; 6. Established. The running of a BGP protocol state machine may be driven by messages including: an open message, a notification message, a keep-alive message, an update message, and a Refresh message. The open message establishes a connection between BGP peers; the notification message is an error notification message and may cause the BGP session to disconnect. When the BGP session is disconnected, a Transmission Control Protocol (TCP) session between two BGP peers will be closed, and all resources related to the TCP session are released, a "route withdraw" message is sent to other BGP peers in the autonomous system, and routes related to the TCP session in all the BGP peers are cancelled. The keep-alive message is configured to detect connection validity. The update message is configured to exchange route information between BGP peers. The Refresh message is configured to request the peer to resend route information of a designated address.

According to the BGP protocol, an address family may be changed by activating or deactivating a specific value. An application corresponding to the specific value is enabled, and the router obtains route information corresponding to the application, so that the application is provided for users after the router establishes a BGP session with other routers. Multiple applications may be provided based on the established BGP session, such as an IPv4 (Internet Protocol version 4) session or IPv6 session.

In one technique, if an IPv4 session is successfully established between two routers which are called as RTA and RTB and an IPv4 unicast application is enabled, when a multicast application needs to be added between the RTA and RTB, the established IPv4 session will be disconnected. If an IPv4 session is successfully established between the RTA and RTB, and an IPv4 unicast application and an IPv4 multicast application are enabled, when only the IPv4 multicast application needs to be terminated between the RTA and RTB, the established IPv4 session will also be disconnected, and thus the IPv4 unicast application will be terminated.

Thus, in this case, when the application is changed in the BGP session, the BGP session (which was successfully established before the application change) will be disconnected. A new BGP session corresponding to the changed application will then be established, which results in the application which was enabled before the application change being terminated.

Figure 1:
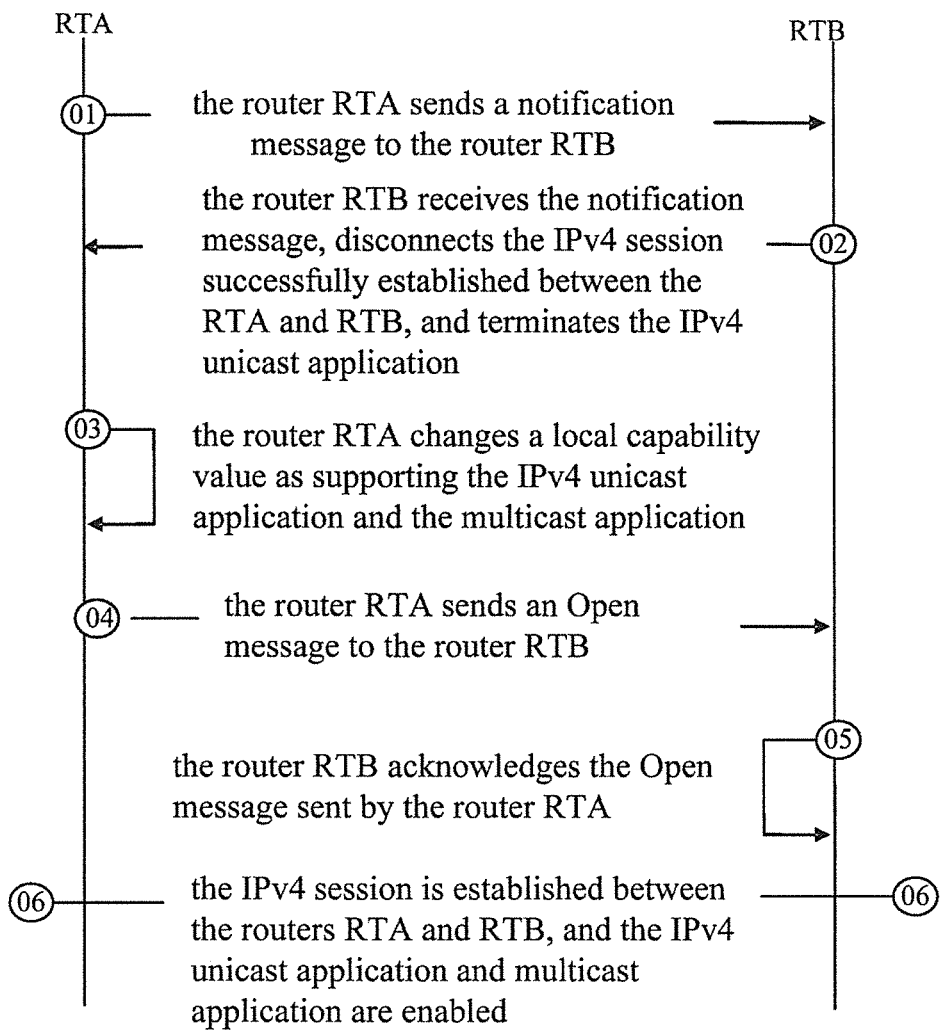
FIG. 1 is a signal flowchart illustrating a procedure of adding a multicast application between two routers between which an IPv4 session is successfully established and an IPv4 unicast application is enabled.
Figure 2:
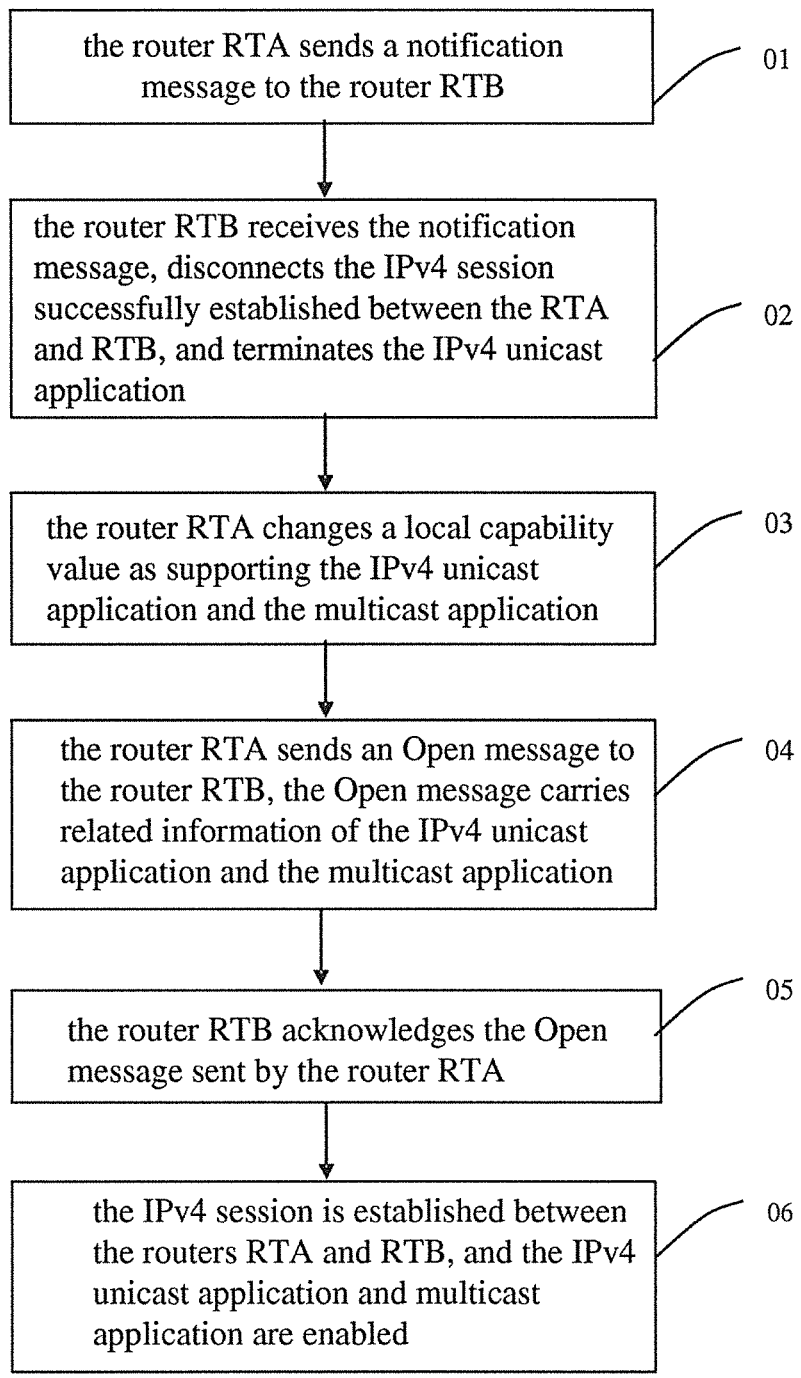
FIG. 2 is a flowchart illustrating steps corresponding to the signal flowchart shown in FIG. 1.

In one example, when an application needs to be changed in a BGP session, for example, when an IPv4 session is successfully established between two routers RTA and RTB and an IPv4 unicast application is enabled, a multicast application needs to be added between the routers RTA and RIB, the following steps are included, as shown in FIGS. 1 and 2.

Step 01, the router RTA sends a notification message to the router RTB;

Step 02, the router RTB receives the notification message, disconnects the IPv4 session successfully established between the RTA and RTB, and terminates the IPv4 unicast application;

Step 03, the router RTA changes a local capability value as supporting the IPv4 unicast application and the multicast application;

Step 04, the router RTA sends an Open message to the router RTB, and the Open message carries related information of the IPv4 unicast application and the multicast application;

Step 05, the router RTB acknowledges the Open message sent by the router RTA;

Step 06, the IPv4 session is established between the routers RTA and RTB, and the IPv4 unicast application and multicast application are enabled.

As can be seen from the above steps, when the application is changed in the BGP session, the BGP session successfully established before the application change will be disconnected, and then a BGP session corresponding to the changed application will be established, which results in the termination of the application enabled before the application change.

Another example provides a method, system and router for changing an application in a BGP session, the application change being performed by two routers between which a session is successfully established. The two routers perform steps, such as sending an Open message carrying all application capability values locally supported, and may go through the states, such as Idle, Connect, Active, OpenSend, Open-Confirm, Established. In other words, the example is applied when the application needs to be added or cancelled.

Specifically, in the method provided by this example, when changing the application, the router does not send the notification message to opposite peer, but changes the application capability value locally supported, i.e. changes the local capability value, and changes the address family, e.g. activates an address family to enable an application or deactivates an address family to disable an application. In addition, the router may send route information corresponding to the changed application to the opposite peer, and send the Refresh message at the same time to request the opposite peer to resend route information of a designated address. The route information corresponding to the changed application may be obtained according to the BGP protocol and will not be described herein. In this way, when the application is changed in the BGP session, it only needs to change the address family and the local capability value without disconnecting the established BGP session, thereby improving the stability of the BGP session and avoiding the influence of application change to the application enabled before the application change.

In one example, when the application change is performed, configuration operations for the two routers are performed successively, and thus the later router may lose some routes sent by the former router. Therefore, in this example, after the configuration is finished, the later router may explicitly send a Refresh message to the former router, so as to avoid the above loss of routes. In this case, for the router related to the application change, the operations to be performed includes: changing the local capability value and the address family, sending route information corresponding to the changed application and the Refresh message, in other words, the two routers perform the same operations when changing the application in the successfully established session.

Figure 3:
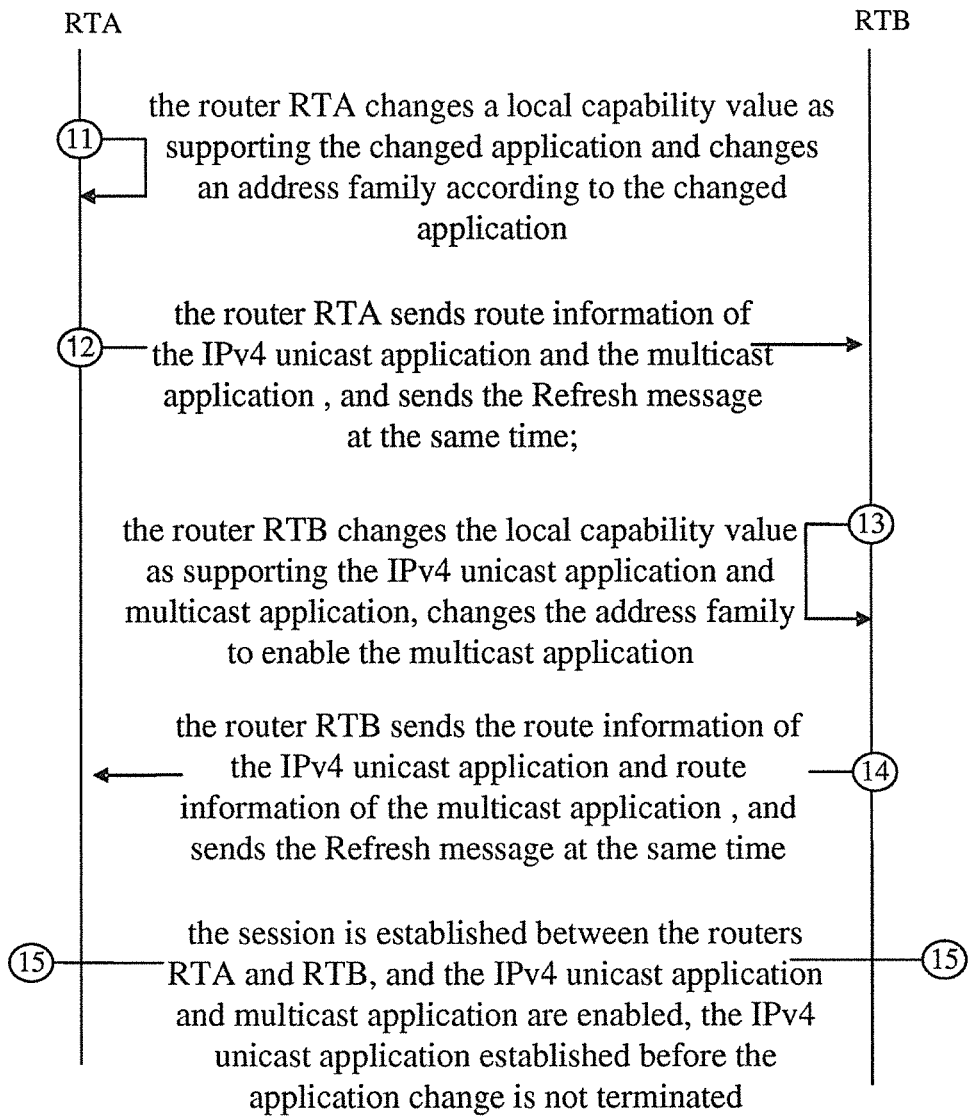
FIG. 3 is a signal flowchart illustrating a method for changing an application in a BGP session in accordance with an example.
Figure 4:
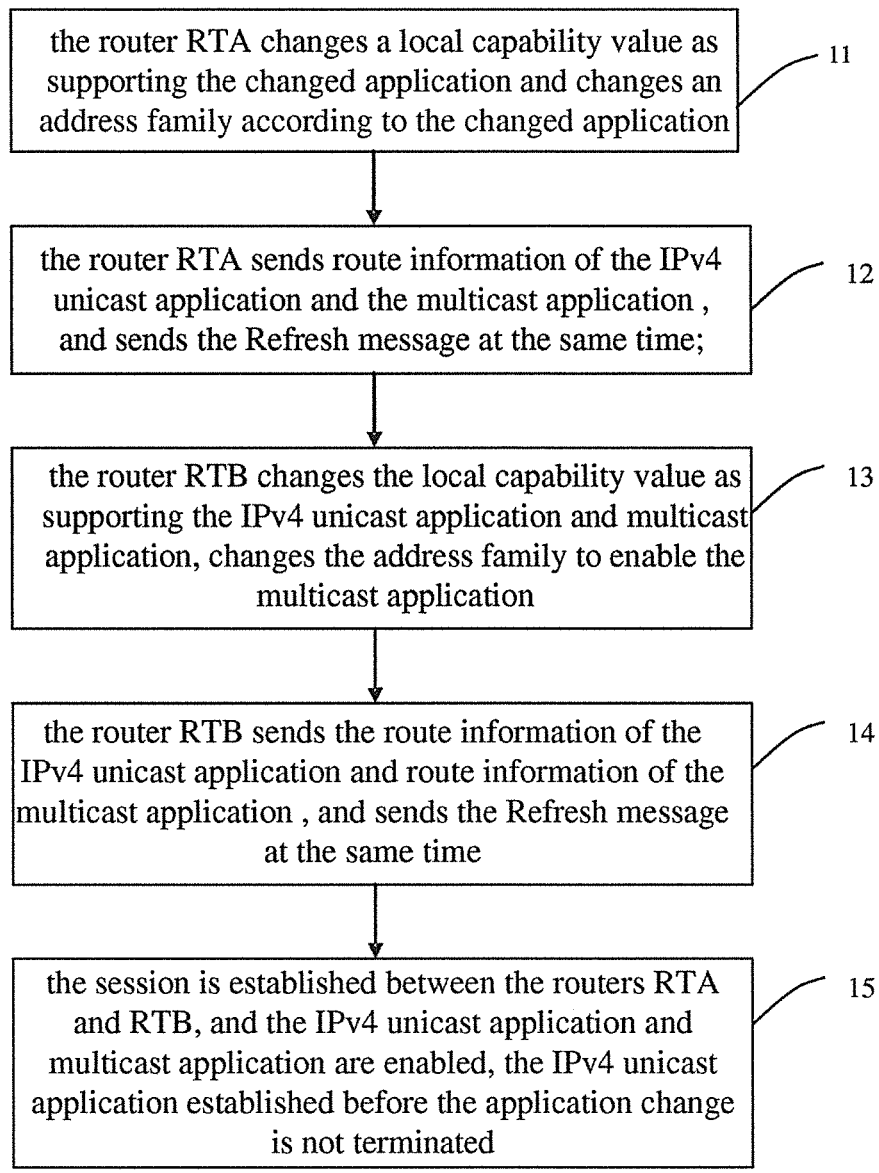
FIG. 4 is a flowchart illustrating steps corresponding to the signal flowchart shown in FIG. 3.

FIG. 3 and FIG. 4 show a method for changing an application in a BGP session in one example. In this example, two routers RTA and RTB both support unicast and multicast applications, an IPv4 session is established between the routers RTA and RTB and the IPv4 unicast application is enabled. In this example, the application change includes adding an application, e.g. adding the multicast application. The method includes the following steps.

Step 11, the router RTA changes a local capability value as supporting the changed application and changes an address family according to the changed application, specifically, the router RTA changes the local capability value as supporting the IPv4 unicast application and multicast application, activates the address family to enable the multicast application;

Step 12, the router RTA sends route information of the IPv4 unicast application and route information of the multicast application to the router RTB, and sends the Refresh message at the same time; the Refresh message is configured to request the router RTB to resend route information of a designated address, i.e. to resend route information corresponding to the changed application;

Step 13, the router RTB receives the Refresh message sent by the router RTA, changes the local capability value as supporting the IPv4 unicast application and multicast application, changes the address family to enable the multicast application;

Step 14, the router RTB sends the route information of the IPv4 unicast application and route information of the multicast application to the router RTA, and sends the Refresh message at the same time; the Refresh message is configured to request the router RTA to resend route information of a designated address, i.e. to resend route information corresponding to the changed application;

Step 15, the session is established between the routers RTA and RTB, and the IPv4 unicast application and multicast application are enabled. During the above procedure, the IPv4 unicast application established before the application change is not terminated.

As can be seen, in the procedure of the above example, the router RTA does not send the Notification information to the router RTB, so that the IPv4 unicast application established before the application change will not be terminated, thereby improving the stability of the BGP session.

Figure 5:
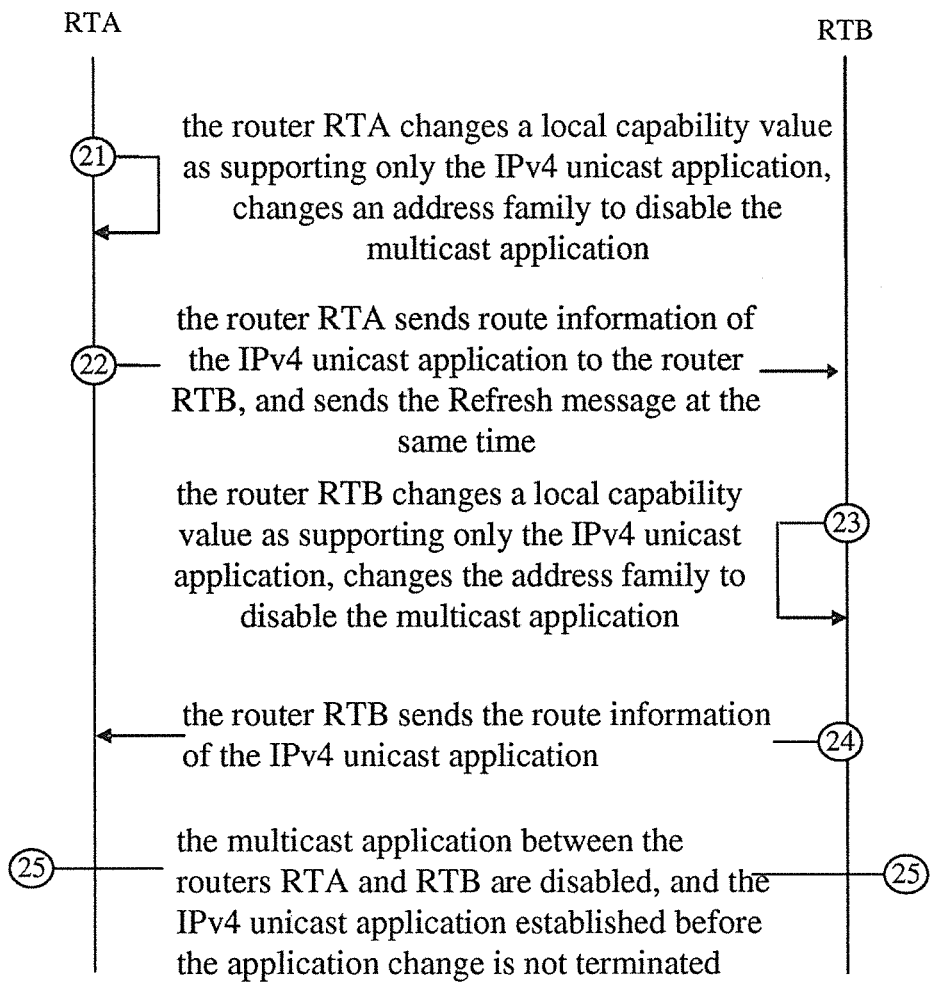
FIG. 5 is a signal flowchart illustrating a method for changing an application in a BGP session in accordance with another example.
Figure 6:
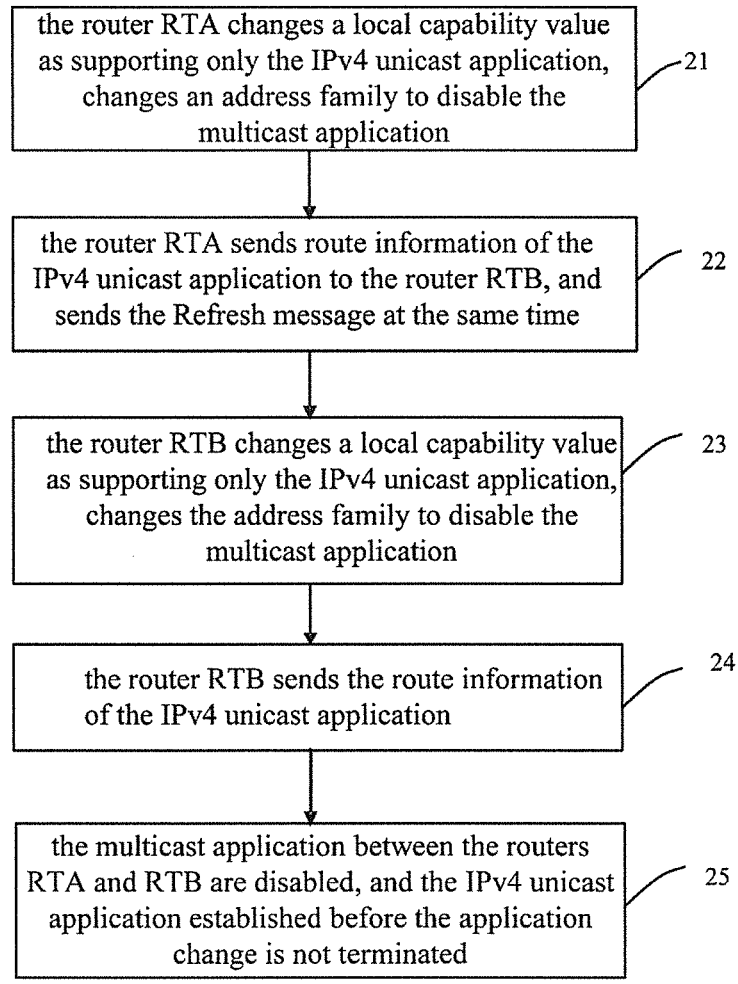
FIG. 6 is a flowchart illustrating steps corresponding to the signal flowchart shown in FIG. 5.

FIG. 5 and FIG. 6 show a method for changing an application in a BGP session provided by another example. In this example, two routers RTA and RTB both support unicast and multicast applications, an IPv4 session is established between the routers RTA and RTB, and the IPv4 unicast application and multicast application are enabled. In this example, the application change includes terminating an application, e.g. terminating the multicast application. The method includes the following steps.

Step 21, the router RTA changes a local capability value as supporting only the IPv4 unicast application, changes an address family to disable the multicast application;

Step 22, the router RTA sends route information of the IPv4 unicast application to the router RTB, and sends the Refresh message at the same time; the Refresh message is configured to request the router RTB to resend route information of a designated address;

Step 23, the router RTB changes the local capability value as supporting only the IPv4 unicast application, changes the address family to disable the multicast application;

Step 24, the router RTB sends the route information of the IPv4 unicast application to the router RTA after receiving the Refresh message from the router RTA;

Step 25, the multicast application between the routers RTA and RTB are disabled, and the IPv4 unicast application established before the application change is not terminated.

In one example, if an application established between two routers needs to be terminated, after the two routers have changed their local capability values and address families, if the route information corresponding to the terminated application is not sent to the opposite peer, the utilization of subsequence applications will not be affected. Therefore, the router RTA may not send the route information of the IPv4 unicast application and the Refresh message in step 22, correspondingly, in step 24, the router RTB changes the local capability value as only supporting the IPv4 unicast application, changes the address family to disable the multicast application, but does not send the route information of the IPv4 unicast application to the router RTA. For the routers RTA and RTB, the operations for changing the application includes changing the local capability value as only supporting the IPv4 unicast application, and changes the address family to disable the multicast application.

As can be seen, in the procedure of the above example, the router RTA does not send the Notification information to the router RTB, so that the IPv4 unicast application established before the application change will not terminated, thereby improving the stability of the BGP session.

Further examples also provide a system for changing an application in a BGP session, and the system includes two routers RTA and RTB which support unicast and multicast applications. In the example, an IPv4 session is established between the routers RTA and RTB and the unicast application and multicast application are enabled. The application change includes adding the unicast application.

The router RTA is configured to change a local capability value as supporting the unicast and multicast applications, change the address family to enable the added multicast application, to send route information of the unicast and multicast applications to the router RTB, and to send a Refresh message at the same time when sending the route information; the Refresh message is configured to request the router RTB to resend route information of a designated address.

The router RTB is configured to, after receiving the Refresh message sent by the router RTA, change the local capability value as supporting the unicast and multicast applications, changes an address family to enable the added multicast application, to send route information of the unicast and multicast applications to the router RTA, and to send a Refresh message to the router RTA at the same time when sending the route information; the Refresh message is configured to request the router RTA to resend route information of a designated address.

As can be seen, in the apparatus of this example, when the unicast application is added between two routers, the multicast application established before the application change is not terminated, so that the influence of application update on the original applications is avoided, thereby improving the stability of the BGP session.

It should be noted that, the present application is applicable to not only unicast application or multicast application, but also IPv6 applications and VPNv4 applications.

In addition, when the router not supporting the above method performs application change, the notification message is sent out, and then a session established between the router and a router receiving the notification message is disconnected.

Figure 7:
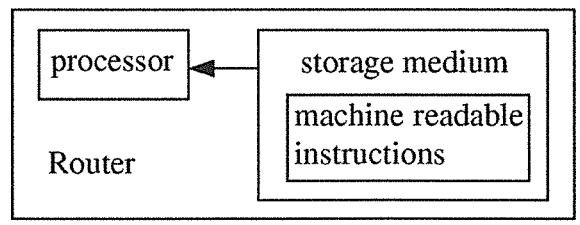
FIG. 7 is a schematic diagram illustrating a structure of a router in accordance with another example.

Further examples also provide a router for changing an application in a BGP session, as shown in FIG. 7. The router includes a processor and a storage medium storing machine readable instructions which are executable by the processor to change an application in the session and change a local capability value stored on a memory of the router to a value which supports the changed application and change an address family to correspond with the changed application.

In an example, the machine readable instructions includes instructions to send route information corresponding to the changed application to the second router and send a Refresh message to the second router; the Refresh message requesting the second router to resend route information of a designated address.

In an example, the machine readable instructions comprise instructions to disconnect the established session after receiving a notification message corresponding to the established session.

In an example, the application includes at least one of a multicast application, a unicast application, an IPv6 application and an IPv4 application.

The invention claimed is:

1. A method for changing an application in a BGP (Border Gateway Protocol) session, said session being established between a first router and a second router, and an application being enabled in said session, the method comprising:
when changing an application, the first router changing a local capability value stored on a memory of the first router to a value which supports the changed application and changing an address family to correspond with the changed application, wherein changing the application comprises adding a new application, and wherein the method further comprises:
without terminating the BGP session, the first router sending route information corresponding to the changed application to the second router and at the same time sending a Refresh message to the second router, wherein the Refresh message requests the second router to send route information of a designated address for the changed application, and wherein, in response to receiving the route information corresponding to the changed application and the Refresh message, the second router changes a local capability value of the second router as supporting the changed application to enable the changed application without terminating the BGP session.

2. The method of claim 1, further comprising:
the first router receiving a Refresh message from the second router; and the first router resending route information of a designated address to the second router corresponding to the changed application.

3. The method of claim 1, further comprising:
the first router disconnecting the established session when receiving a notification message corresponding to the established session.

4. The method of claim 1, wherein the application comprises at least one of a multicast application, a unicast application, an IPv6 application and an IPv4 application.

5. The method of claim 1, wherein the application is enabled for the session, and the method comprises changing the application enabled for the session without disconnecting the session.

6. A system for changing an application in a BGP (Border Gateway Protocol) session which has been established between a first router and a second router, the system comprising the first router comprising a processor and a memory storing machine readable instructions executable by the processor when changing an application to change a local capability value to support the changed application and to change an address family to correspond with the changed application, wherein, when executed, the machine readable instructions cause the processor to send route information corresponding to the changed application to the second router, and at the same time send a Refresh message to the second router, wherein the Refresh message is configured to request the second router to resend route information of a designated address for the changed application, and wherein, in response to receiving the route information corresponding to the changed application and the Refresh message, the second router is to change a local capability value of the second router as supporting the changed application to enable the changed application without terminating the BGP session.

7. The system of claim 6, wherein machine readable instructions stored on a memory of the second router comprise instructions to send a Refresh message to the first router when sending the route information corresponding to the changed application to the first router, the Refresh message being configured to request the first router to resend router information corresponding to a designated address.

8. The system of claim 6, wherein the first router is further configured to disconnect the established session when receiving a notification message corresponding to the established session.

9. The system of claim 6, wherein the application comprises at least one of a multicast application, a unicast application, an IPv6 application and an IPv4 application.

10. The system of claim 6, wherein the application is enabled for the session, and the machine readable instructions executed by the processor change the application enabled for the session without disconnecting the session.

11. The system of claim 10, wherein the machine readable instructions executed by the processor to change the application are to:
enable a new application to the session without terminating an existing application for the session, and the changed local capability value represents both enabled applications, and the changed address family includes address families for both enabled applications.

12. A router for changing an application in a BGP (Border Gateway Protocol) session, comprising a processor and a storage medium storing machine readable instructions which are executable by the processor when changing an application in the session to change a local capability value stored on a memory of the router to a value which supports the changed application and change an address family to correspond with the changed application, wherein the machine readable instructions, when executed, further cause the processor to send route information corresponding to the changed application to a second router and at the same time send a Refresh message to the second router, wherein the Refresh message is to request the second router to resend route information of a designated address for the changed application, and wherein, in response to receiving the route information corresponding to the changed application and the Refresh message, the second router is to change a local capability value of the second router as supporting the changed application to enable the changed application without terminating the BGP session.

13. The router of claim 12, wherein the machine readable instructions comprise instructions to disconnect the established session after receiving a notification message corresponding to the established session.

14. The router of claim 12, wherein the application comprises at least one of a multicast application, a unicast application, an IPv6 application and an IPv4 application.

15. The router of claim 12, wherein the application is enabled for the session, and the machine readable instructions executed by the processor change the application enabled for the session without disconnecting the session.

16. The router of claim 12, wherein the machine readable instructions executed by the processor to change the application are to:
enable a new application to the session without terminating an existing application for the session, and the changed local capability value represents both enabled applications, and the changed address family includes address families for both enabled applications.

17. The router of claim 12, wherein the machine readable instructions executed by the processor to change the application are to:
enable a new application to the session and terminate an existing application for the session, and the changed local capability value represents the new application, and the changed address family is for the new application.

* * * * *